US005907642A

United States Patent [19]

Ito

[11] Patent Number: 5,907,642
[45] Date of Patent: May 25, 1999

[54] METHOD AND APPARATUS FOR ENHANCING IMAGES BY EMPHASIS PROCESSING OF A MULTIRESOLUTION FREQUENCY BAND

[75] Inventor: Wataru Ito, Kanagawa-ken, Japan

[73] Assignee: Fuji Photo Film Co., Ltd., Kanagawa-ken, Japan

[21] Appl. No.: 08/685,613

[22] Filed: Jul. 24, 1996

[30] Foreign Application Priority Data

Jul. 27, 1995 [JP] Japan .................................. 7-191518
Jul. 27, 1995 [JP] Japan .................................. 7-191521

[51] Int. Cl.$^6$ ................................................ G06K 9/54
[52] U.S. Cl. ........................ 382/302; 382/274; 348/398
[58] Field of Search ............................ 382/240, 302, 382/132, 128, 264, 274, 254, 263; 250/584, 586; 378/98.4, 207, 62; 348/397, 398; 358/462

[56] References Cited

U.S. PATENT DOCUMENTS

| | | | |
|---|---|---|---|
| 5,166,810 | 11/1992 | Sorimachi et al. | 358/462 |
| 5,461,655 | 10/1995 | Vuylsteke et al. | 378/62 |
| 5,467,404 | 11/1995 | Vuylsteke et al. | 382/128 |
| 5,491,514 | 2/1996 | Fukuda et al. | 348/397 |
| 5,526,446 | 6/1996 | Adelson et al. | 382/275 |
| 5,644,662 | 7/1997 | Vuylsteke | 382/302 |

OTHER PUBLICATIONS

"Contrast Enhancement Using Burt Pyramid Processing", R. F. Bessler and J.H. Arbeiter 1986 source for Information Display (SID) International Symposium, Digest of Technical Papers pp. 352–353, May 1986.

"The Laplacian Pyramid as a Compact Image Code", Peter J. Burt and Edward H. Adelson IEEE Transactions on Communications, Com 31 (1983) 532–540.

"Multiscale Image Contrast Amplification", Pieter Vuylsteke and Emile Schoeters SPIE 2167 (1994) 551–560.

"Fast Filter Transforms for Image Processing", Peter J. Burt, Computer Graphics and Image Processing 16 (1981) 20–51.

"Fast Computation of the Difference of Low–Pass Transform", J. L. Crowley and Richard M. Stern, IEEE Transactions on Pattern Analysis and Machine Intelligence 6 pp. 212–222, 1984.

"A Theory for Multiresolution Signal Decomposition: The Wavelet Representation" Stephane G. Mallat, IEEE Transactions on Pattern Analysis and Machine Intelligence II (1989) 674–693.

(List continued on next page.)

*Primary Examiner*—Jose L. Couso
*Assistant Examiner*—Anh Hong Do
*Attorney, Agent, or Firm*—Sughrue, Mion, Zinn, Macpeak & Seas, PLLC

[57] ABSTRACT

An original image is transformed into a multi-resolution space and thereby decomposed into images, each of which is of one of a plurality of different frequency bands. An operation for multiplying by an emphasis coefficient is carried out on an image of a predetermined frequency band, which is among the plurality of the different frequency bands. The emphasis coefficient is set such that the degree of emphasis for an image portion in the image of the predetermined frequency band may become higher than the degree of emphasis for the other portions in the image of the predetermined frequency band, the image portion corresponding to a portion in an image of a frequency band lower than the predetermined frequency band, at which portion the absolute value of the signal value of the image of the lower frequency band is comparatively large. An inverse multi-resolution transform is carried out on the image of the predetermined frequency band, which has been obtained from the operation for multiplying by the emphasis coefficient, and the images of the other frequency bands. A processed image is thereby obtained.

12 Claims, 8 Drawing Sheets

OTHER PUBLICATIONS

"Wavelets and Signal Processing", Oliver Rioul and Martin Vetterli, IEEE Spectrum Magazine (1991) 14–38.

"Zero–Crossing of a Wavelet Transform", Stephane Mallat, IEEE Transactions on Information Theory 37 (1991) 1019–1033.

"Contrast Enhancement by Dyadic Wavelet Analysis", Andrew Laine, Jian Fan, Sergio Schuler, Engineering in Medicine and Biology Society, Engineering Advances: New Opportunities for Biomedical Engineers, Proc. 16th Ann. Intl. Conf. of IEEE, 1994.

"Mammographic Feature Enhancement by Multicate Analysis," Andrew F. Laine, Sergio Schuler, Jian Fan, and Walter Huda, IEEE Transactions on Medical Imaging 13 (1994) 725–740.

"Image Compression by Gabor Expansion", T. Ebrahimi and Murat Kunt, Optical Engineering 30 (1991) 873–880.

FIG.3

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

$b_0$  $N/2 \sim N$ $b_1$  $N/4 \sim N/2$ $b_2$  $N/8 \sim N/4$

•
•
•
•

$b_{L-1}$  $N/2^L \sim N/2^{L-1}$ $g_L$  $0 \sim N/2^L$

F I G . 7
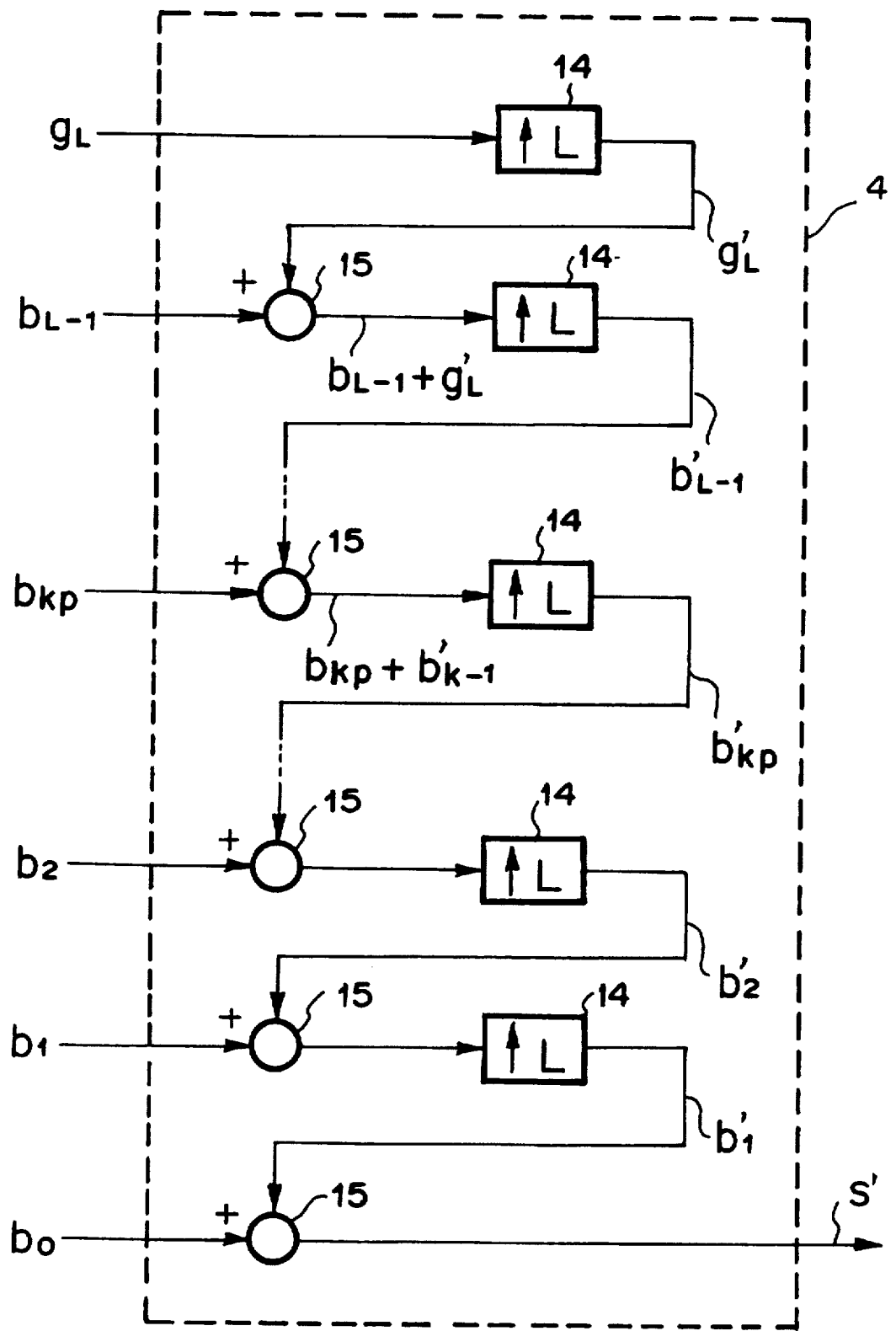

METHOD AND APPARATUS FOR ENHANCING IMAGES BY EMPHASIS PROCESSING OF A MULTIRESOLUTION FREQUENCY BAND

BACKGROUND OF THE INVENTION

1. Field of the Invention

This invention relates to an image processing method and apparatus for carrying out image processing on an image of a predetermined frequency band in an original image.

2. Description of the Prior Art

Techniques for obtaining an image signal, which represents an image, carrying out appropriate image processing on the image signal, and then reproducing a visible image by use of the processed image signal have heretofore been known in various fields. For example, in Japanese Unexamined Patent Publication No. 55(1980)-163772, the applicant proposed a method for carrying out frequency emphasis processing, such as unsharp mask processing, on an image signal, such that a visible radiation image may be obtained, which has good image quality and can serve as an effective tool in, particularly, the efficient and accurate diagnosis of an illness. With the frequency processing, an unsharp mask signal is subtracted from an image signal representing an original image, the resulting difference value is multiplied by an emphasis coefficient, and the thus obtained product is added to the image signal. In this manner, predetermined frequency components in the image are emphasized.

A different method for carrying out frequency processing on an image signal has also been proposed. With the proposed frequency processing method, an image is transformed into multi-resolution images by a Fourier transform, a wavelet transform, a sub-band transform, or the like, and the image signal representing the image is thereby decomposed into signals falling within a plurality of different frequency bands. Thereafter, of the decomposed signals, a signal falling within a desired frequency band is subjected to predetermined image processing, such as emphasis.

Further, recently, in the field of image processing, a novel technique for transforming an image into a multi-resolution space, which is referred to as the Laplacian pyramid technique, has been proposed in, for example, Japanese Unexamined Patent Publication No. 6(1994)-301766. With the proposed Laplacian pyramid technique, mask processing is carried out on the original image by using a mask having characteristics such that it may be approximately represented by a Gaussian function. A sub-sampling operation is then carried out on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Mask processing is then carried on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and N number of unsharp images having sizes of $\frac{1}{2}^{2N}$ of the size of the original image are thereby formed. As described above, the sampling operation is carried out on the image, which has been obtained from the mask processing with the mask having characteristics such that it may be approximately represented by the Gaussian function. Therefore, though the Gaussian filter is used actually, the same processed image as that obtained when a Laplacian filter is used is obtained. Also, in this manner, the images of low frequency bands, which have the sizes of $\frac{1}{2}^{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low•Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

Japanese Unexamined Patent Publication No. 6(1994)-301766 mentioned above discloses a method, wherein processing for emphasizing image values is carried out on the images of all of the frequency bands in the Laplacian pyramid, which images have been obtained in the manner described above, and the image of each frequency band, which has been obtained from the emphasis processing, is then subjected to an inverse transform, and a processed image is thereby obtained. In the disclosed method, the image emphasis is carried out on the image signal of each frequency band by using the formula shown below.

$$y = -m \times (x/m)^p \quad (x<0)$$

$$y = m \times (-x/m)^p \quad (x \geq 0)$$

wherein x represents the picture element value of each picture element in the image, y represents the picture element value of each picture element in the image obtained from the emphasis processing, and m represents the range of values which the picture elements can take (for example, m=1,023 in cases where the range of values, which the picture elements can take, is 10 bits). Specifically, as the value of p becomes smaller, the degree of emphasis becomes higher. As the value of p becomes larger, the degree of emphasis becomes lower. The image emphasis is carried out with such a degree of emphasis. In the image obtained from such processing, the image has been emphasized in each frequency band. Therefore, an image is obtained such that unsharp mask processing might have been carried out substantially with masks having a plurality of sizes in the aforesaid unsharp mask processing.

However, in the method disclosed in Japanese Unexamined Patent Publication No. 6(1994)-301766 mentioned above, when the emphasis processing is carried out on the image of a certain frequency band, unnecessary components, such as noise, are emphasized together with the image components, such as contours of the object, which it is necessary to emphasize. Therefore, as a result of the processing, an image is obtained in which the components, such as contours of the object, and noise have been emphasized. Accordingly, the image obtained from the image processing becomes difficult to view due to much noise.

Also, in the method disclosed in Japanese Unexamined Patent Publication No. 6(1994)-301766 mentioned above, the emphasis processing is carried out with the same degree of emphasis for all of different regions in the image of each frequency band. For example, in cases where the image to be emphasized is a radiation image of the chest of a human body, an image portion having a comparatively high density, such as the lung field region, is the one which was recorded with a large amount of radiation and contains little quantum noise. However, an image portion having a comparatively low density, such as the mediastinum region, is the one which was recorded with a small amount of radiation and contains much quantum noise. Therefore, if the emphasis processing is carried out on the radiation image of the chest by using the method disclosed in Japanese Unexamined Patent Publication No. 6(1994)-301766, noise in the mediastinum region will become perceptible in the image, which is obtained from the emphasis processing, and the image will become difficult to view.

SUMMARY OF THE INVENTION

The primary object of the present invention is to provide an image processing method, wherein only the components, which it is necessary to emphasize, in an image are emphasized, and a processed image having good image quality is obtained.

Another object of the present invention is to provide an image processing method, wherein emphasis processing is carried out such that a processed image, which has good image quality and in which noise is imperceptible, may be obtained even if an image, such as a chest image, which has an image portion containing comparatively much noise, is subjected to the emphasis processing.

The specific object of the present invention is to provide an apparatus for carrying out the image processing method.

The present invention provides a first image processing method, comprising the steps of:

i) transforming an original image into a multi-resolution space, the original image being thereby decomposed into images, each of which is of one of a plurality of different frequency bands, ii) carrying out an operation for multiplying by an emphasis coefficient on an image of a predetermined frequency band, which is among the plurality of the different frequency bands, the emphasis coefficient being set such that the degree of emphasis for an image portion in the image of the predetermined frequency band may become higher than the degrees of emphasis for the other portions in the image of the predetermined frequency band, the image portion corresponding to a portion in an image of a frequency band lower than the predetermined frequency band, at which portion the absolute value of the signal value of the image of the lower frequency band is comparatively large, and iii) carrying out an inverse multi-resolution transform of the image of the predetermined frequency band, which has been obtained from the operation for multiplying by the emphasis coefficient, and the images of the other frequency bands, a processed image being obtained from the inverse multi-resolution transform.

The present invention also provides a first image processing apparatus, comprising:

i) an image decomposing means for transforming an original image into a multi-resolution space, and thereby decomposing the original image into images, each of which is of one of a plurality of different frequency bands, ii) an emphasis coefficient multiplying means for carrying out an operation for multiplying by an emphasis coefficient on an image of a predetermined frequency band, which is among the plurality of the different frequency bands, the emphasis coefficient being set such that the degree of emphasis for an image portion in the image of the predetermined frequency band may become higher than the degrees of emphasis for the other portions in the image of the predetermined frequency band, the image portion corresponding to a portion in an image of a frequency band lower than the predetermined frequency band, at which portion the absolute value of the signal value of the image of the lower frequency band is comparatively large, and iii) an inverse transform means for carrying out an inverse multi-resolution transform of the image of the predetermined frequency band, which has been obtained from the operation for multiplying by the emphasis coefficient, and the images of the other frequency bands, and thereby obtaining a processed image.

The term "transforming an original image into a multi-resolution space" as used herein means decomposing the image signal, which represents the original image, into image signals representing the images of a plurality of different frequency bands by using a predetermined filter for the Laplacian pyramid technique, the wavelet transform, the sub-band transform, or the like.

The present invention further provides a second image processing method, comprising the steps of:

i) transforming an original image into a multi-resolution space, the original image being thereby decomposed into images, each of which is of one of a plurality of different frequency bands, ii) calculating the degrees of emphasis for an image of a predetermined frequency band, which is among the plurality of the different frequency bands, in accordance with the density of an image of the lowest frequency band, which is lowest among the plurality of the different frequency bands, such that the degree of emphasis for an image region in the image of the predetermined frequency band may become lower than the degrees of emphasis for the other regions in the image of the predetermined frequency band, the image region corresponding to a region in the image of the lowest frequency band, at which region the density of the image of the lowest frequency band is comparatively low, iii) emphasizing the image of the predetermined frequency band in accordance with the calculated degrees of emphasis, and iv) carrying out an inverse transform of the image of the predetermined frequency band, which has been emphasized, and the images of the other frequency bands, a processed image signal being obtained from the inverse transform.

The present invention still further provides a second image processing apparatus, comprising:

i) a multi-resolution decomposing means for transforming an original image into a multi-resolution space, and thereby decomposing the original image into images, each of which is of one of a plurality of different frequency bands, ii) an emphasis degree calculating means for calculating the degrees of emphasis for an image of a predetermined frequency band, which is among the plurality of the different frequency bands, in accordance with the density of an image of the lowest frequency band, which is lowest among the plurality of the different frequency bands, such that the degree of emphasis for an image region in the image of the predetermined frequency band may become lower than the degrees of emphasis for the other regions in the image of the predetermined frequency band, the image region corresponding to a region in the image of the lowest frequency band, at which region the density of the image of the lowest frequency band is comparatively low, iii) an emphasis means for emphasizing the image of the predetermined frequency band in accordance with the calculated degrees of emphasis, and iv) an inverse transform means for carrying out an inverse transform of the image of the predetermined frequency band, which has been emphasized, and the images of the other frequency bands, and thereby obtaining a processed image signal.

In the images of a plurality of different frequency bands, which are obtained by carrying out the multi-resolution transform on the original image, the components, such as contours of the object, which are contained in the original image, are also contained in the images of low frequency bands. However, components, such as noise components, are contained in the images of high frequency bands and are not contained in the images of comparatively low frequency bands. Therefore, in cases where the absolute value of the signal value is comparatively small at a portion in the image of a frequency band lower than a predetermined frequency band subjected to image emphasis, even if the image portion in the image of the predetermined frequency band, which image portion corresponds to such a portion in the image of the lower frequency band, has a certain level of signal value, there will be a strong probability that the image component represented by the signal corresponding to the image portion in the image of the predetermined frequency band will be noise. Accordingly, if the emphasis processing is carried out on the entire area of the image of the predetermined frequency band, both the necessary components, such as those representing the object, and the unnecessary components, such as noise components, will be emphasized. The first image processing method and apparatus in accordance with the present invention are based on such findings.

Specifically, with the first image processing method and apparatus in accordance with the present invention, wherein the emphasis processing is carried out on the image of the predetermined frequency band, which is among the images of the plurality of the different frequency bands obtained from the transform into the multi-resolution space, as for the image portion in the image of the predetermined frequency band, that corresponds to a portion in an image of a frequency band lower than the predetermined frequency band, at which portion the absolute value of the signal value of the image of the lower frequency band is comparatively large, the degree of emphasis for the image portion in the image of the predetermined frequency band is set to be higher than the degrees of emphasis for the other portions in the image of the predetermined frequency band. As a result, as for an image portion in the image of the predetermined frequency band, that corresponds to a portion in the image of the lower frequency band, at which portion the absolute value of the signal value of the image of the lower frequency band is comparatively small, and that may be considered as being noise, the degree of emphasis becomes lower than the degrees of emphasis for the other portions in the image of the predetermined frequency band. The emphasis processing is thus carried out on the image of the predetermined frequency band. In this manner, the degree of emphasis for the unnecessary components, such as noise components, in the image of the predetermined frequency band becomes lower than the degree of emphasis for the necessary components, such as those representing the object. As a result, the unnecessary components, such as noise components, become imperceptible. Therefore, in the processed image, which is obtained by carrying out the inverse transform of the image of the predetermined frequency band, which has been emphasized in the manner described above, and the images of the other frequency bands, the unnecessary components, such as noise components, which are among the components of the predetermined frequency band, become imperceptible. Accordingly, a processed image, in which only the necessary components, such as those representing the contours of the object, have been emphasized and which has good image quality, can be obtained.

With the second image processing method and apparatus in accordance with the present invention, wherein the emphasis processing is carried out on the image of the predetermined frequency band, which is among the images of the plurality of the different frequency bands obtained from the transform into the multi-resolution space, the degrees of emphasis for the image of the predetermined frequency band are calculated in accordance with the density of the image of the lowest frequency band. The calculation is made such that, as for image region in the image of the predetermined frequency band, that corresponds to a region in the image of the lowest frequency band, at which region the density of the image of the lowest frequency band is comparatively low, the degree of emphasis for the image region in the image of the predetermined frequency band may become lower than the degrees of emphasis for the other regions in the image of the predetermined frequency band. Therefore, in the emphasis processing, the degree of emphasis for the image region in the image of the predetermined frequency band subjected to the emphasis processing, at which region the density is comparatively low, is set to be lower than the degrees of emphasis for the other regions in the image of the predetermined frequency band. As a result, the degree of emphasis for the low-density region containing much noise can be restricted to a low value, and noise is not emphasized. The image of the predetermined frequency band can thus be emphasized. For example, as for a radiation image of the chest of a human body, noise in the mediastinum region having a low density can be restricted, and image information representing the lung field regions having a comparatively high density can be emphasized to a high extent. A processed image having good image quality can thus be obtained.

BRIEF DESCRIPTION OF THE DRAWINGS

FIG. 3 is an explanatory view showing a low pass filter, FIG. 7 is a block diagram showing a restoration processing means.

DESCRIPTION OF THE PREFERRED EMBODIMENTS

The present invention will hereinbelow be described in further detail with reference to the accompanying drawings.

Figure 1:
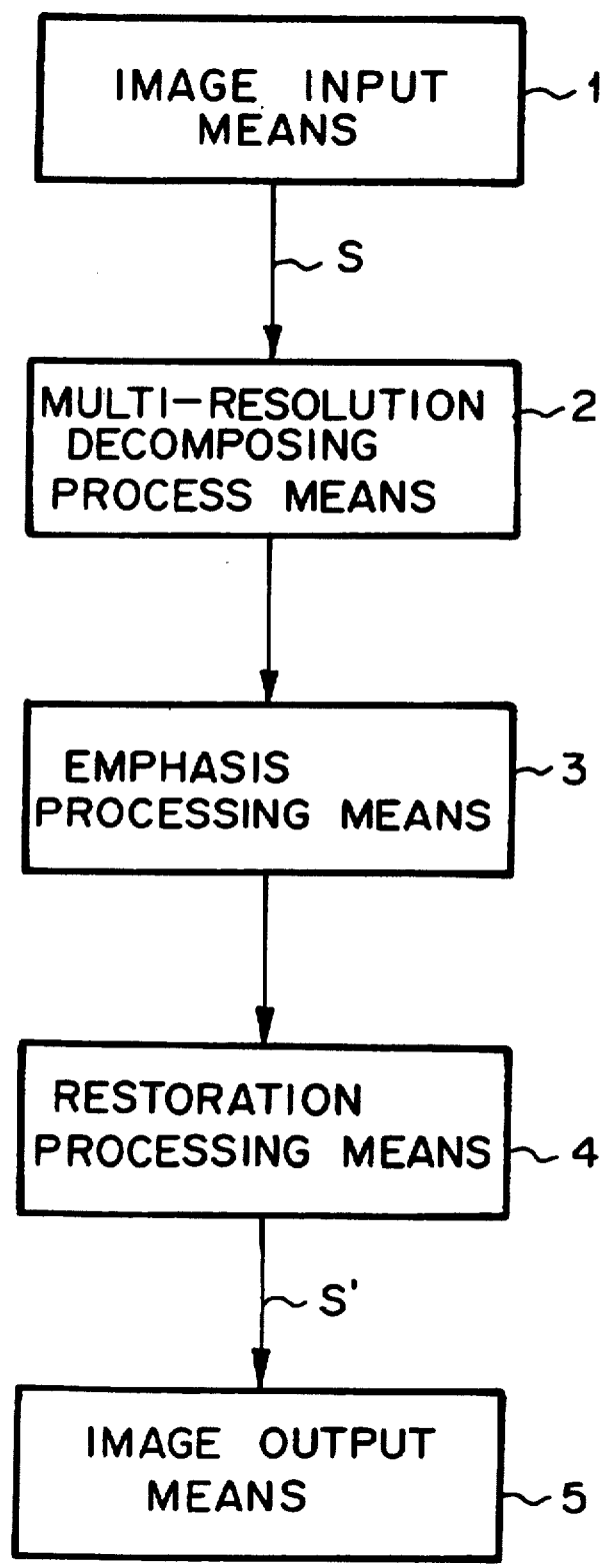
FIG. 1 is a block diagram showing an apparatus for carrying out an embodiment of the first image processing method in accordance with the present invention.

FIG. 1 is a block diagram showing an apparatus for carrying out an embodiment of the first image processing method in accordance with the present invention. As illustrated in FIG. 1, the apparatus for carrying out the embodiment of the first image processing method in accordance with the present invention comprises an image input means 1 for feeding an image signal, which represents an original image, into the apparatus, and a multi-resolution decomposing process means 2 for carrying out a multi-resolution decomposing process on the original image and thereby obtaining decomposed images of a plurality of different frequency bands. The apparatus also comprises an emphasis processing means 3 for carrying out emphasis processing, which will be described later, on an image of a predetermined frequency band, which is among the decomposed images of the plurality of the different frequency bands having been obtained from the multi-resolution decomposing process means 2. The apparatus further comprises a restoration processing means 4 for restoring the image of the predetermined frequency band, which has been obtained from the emphasis processing carried out by the emphasis processing means 3, and the images of the other frequency bands into a processed image. The apparatus still further comprises an image output means 5 for reproducing the processed image, which has been restored by the restoration processing means 4, as a visible image.

Figure 2:
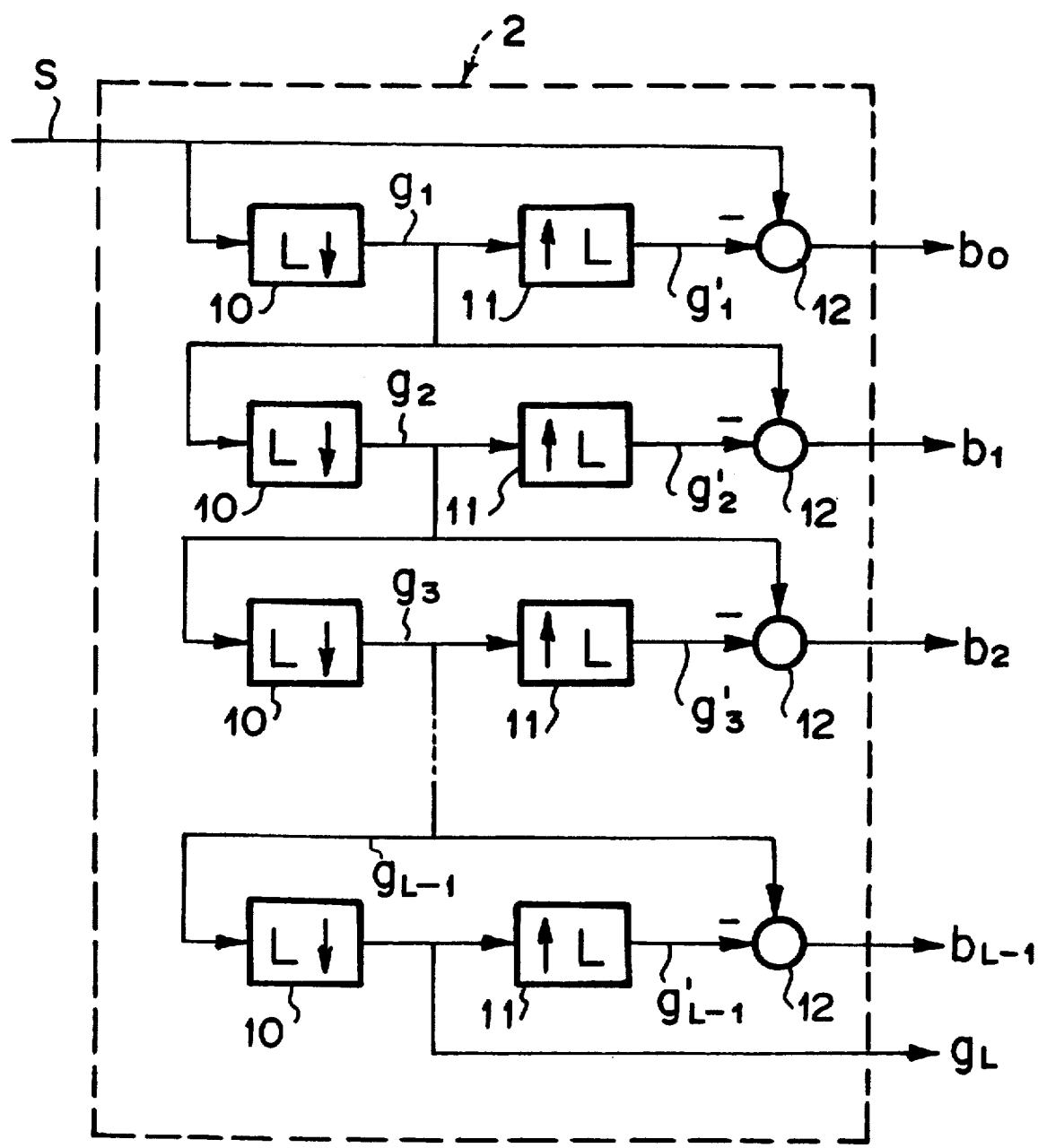
FIG. 2 is a block diagram showing a multi-resolution decomposing process means.

How the embodiment of the first image processing method in accordance with the present invention operates will be described hereinbelow. FIG. 2 is a block diagram showing how the processing is carried out by the multi-resolution decomposing process means 2 shown in FIG. 1. In this embodiment, by way of example, the Laplacian pyramid technique is utilized in order to decompose an image signal S, which represents the original image, into multi-resolution images. As illustrated in FIG. 2, the digital image signal S, which represents the original image, is fed into a first filtering means 10 of the multi-resolution decomposing process means 2. In the multi-resolution decomposing process means 2, the digital image signal S is fed into a first filtering means 10, which carries out a filtering process on the digital image signal S by using a low pass filter. By way of example, as illustrated in FIG. 3, the low pass filter approximately corresponds to a two-dimensional Gaussian distribution on a 5x5 grid. As will be described later, the same types of low pass filters as that shown in FIG. 3 are utilized for all of the multi-resolution images.

Also, in the filtering means 10, the image signal S, which has been obtained from the filtering process carried out with the low pass filter, is subjected to a sampling process. The filtering means 10 samples the signal components of the image signal S at every second row and every second column in the array of picture elements of the original image. An image signal representing a low-resolution approximate image $g_1$ is thus obtained from the filtering means 10. The low-resolution approximate image $g_1$ has a size of one-fourth of the size of the original image. Thereafter, in a first interpolating operation means 11, a single picture element having a value of 0 is inserted into each of the points on the low-resolution approximate image $g_1$, which were eliminated during the sampling process. Specifically, a single picture element having a value of 0 is inserted between every set of two adjacent picture elements located along each row and each column in the array of picture elements of the low-resolution approximate image $g_1$. The low-resolution approximate image $g_1$, into which the picture elements having a value of 0 have thus been inserted at intervals of a single picture element, is unsharp, and the change in the signal value of the low-resolution approximate image $g_1$ is not smooth due to the picture elements having a value of 0, which have been inserted at intervals of a single picture element.

Further, in the first interpolating operation means 11, the low-resolution approximate image $g_1$, into which the picture elements having a value of 0 have been inserted in the manner described above, is subjected to a filtering process with the low pass filter shown in FIG. 3. An image signal representing a low-resolution approximate image $g_1'$ is thus obtained from the first interpolating operation means 11. The change in the signal value of the image signal representing a low-resolution approximate image $g_1'$ is smoother than the change in the signal value of the aforesaid low-resolution approximate image $g_1$, into which the picture elements having a value of 0 have been inserted. Also, the low-resolution approximate image $g_1'$ has the characteristics such that the image information of the frequency band higher than the middle frequency in the frequency band of the original image have been eliminated from the original image. This is because, as described above, the size of the low-resolution approximate image $g_1$ has been reduced to one-fourth of the size of the original image, the picture elements having a value of 0 have been inserted at intervals of a single picture element into the low-resolution approximate image $g_1$, and the filtering process has then been carried out on the low-resolution approximate image $g_1$ by using the low pass filter shown in FIG. 3. As a result, the image is obtained such that the image information of the frequency band higher than the middle frequency in the frequency band of the original image might have been blurred with the Gaussian function.

Figure 4:
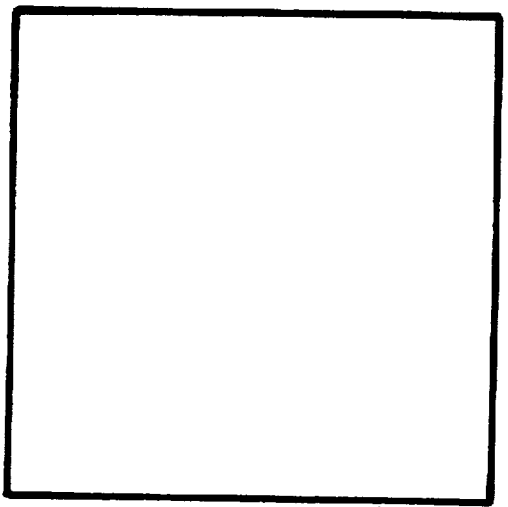
FIG. 4 is an explanatory view showing detail images of a plurality of different frequency bands, which are obtained with a Laplacian pyramid technique.
Figure 4:
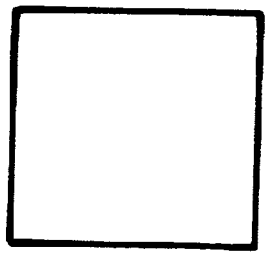
Figure 4:
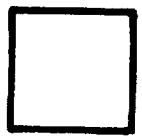
Figure 4:
Figure 4:

Thereafter, in a first subtracter 12, the image signal representing the low-resolution approximate image $g_1'$ is subtracted from the image signal S representing the original image, and an image signal representing a detail image $b_0$ is thereby obtained. Specifically, the image signal components of the image signal representing the low-resolution approximate image $g_1'$ and the image signal S representing the original image, which image signal components represent corresponding picture elements in the two images, are subtracted from each other. As described above, the low-resolution approximate image $g_1'$ has the characteristics such that the image information of the frequency band higher than the middle frequency in the frequency band of the original image might have been blurred. Therefore, the detail image $b_0$ represents only the image information of the frequency band higher than the middle frequency in the frequency band of the original image. Specifically, as illustrated in FIG. 4, the detail image $b_0$ represents the image information of the frequency band of N/2 to N, where N represents the Nyquist frequency of the original image.

Thereafter, the image signal representing the low-resolution approximate image $g_1$ is fed into a second filtering means 10 and subjected to the filtering process using the low pass filter shown in FIG. 3. Also, in the filtering means 10, the image signal representing the low-resolution approximate image $g_1$, which has been obtained from the filtering process, is subjected to a sampling process. The filtering means 10 samples the signal components of the image signal, which represents the low-resolution approximate image $g_1$, at every second row and every second column in the array of picture elements of the low-resolution approximate image $g_1$. An image signal representing a low-resolution approximate image $g_2$ is thus obtained from the filtering means 10. The low-resolution approximate image $g_2$ has a size of one-fourth of the size of the low-resolution approximate image $g_1$, i.e. a size of one-sixteenth of the size of the original image. Thereafter, in a second interpolating operation means 11, a single picture element having a value of 0 is inserted into each of the points on the low-resolution approximate image $g_2$, which were eliminated during the sampling process. Specifically, a single picture element having a value of 0 is inserted between every set of two adjacent picture elements located along each row and each column in the array of picture elements of the low-resolution approximate image $g_2$. The low-resolution approximate image $g_2$, into which the picture elements having a value of 0 have thus been inserted at intervals of a single picture element, is unsharp, and the change in the signal value of the low-resolution approximate image $g_2$ is not smooth due to the picture elements having a value of 0, which have been inserted at intervals of a single picture element.

Further, in the second interpolating operation means 11, the low-resolution approximate image $g_2$, into which the picture elements having a value of 0 have been inserted in the manner described above, is subjected to a filtering process with the low pass filter shown in FIG. 3. An image signal representing a low-resolution approximate image $g_2'$ is thus obtained from the first interpolating operation means 11. The change in the signal value of the image signal representing a low-resolution approximate image $g_2'$ is smoother than the change in the signal value of the aforesaid low-resolution approximate image $g_2$, into which the picture elements having a value of 0 have been inserted. Also, the low-resolution approximate image $g_2'$ has the characteristics such that the image information of the frequency components higher than the middle frequency in the frequency band of the low-resolution approximate image $g_1$ has been eliminated from the low-resolution approximate image $g_1$.

Thereafter, in a second subtracter 12, the image signal representing the low-resolution approximate image $g_2'$ is subtracted from the image signal representing the low-resolution approximate image $g_1$, and an image signal representing a detail image $b_1$ is thereby obtained. Specifically, the image signal components of the image signal representing the low-resolution approximate image $g_2'$ and the image signal representing the low-resolution approximate image $g_1$, which image signal components represent corresponding picture elements in the two images, are subtracted from each other. As described above, the low-resolution approximate image $g_2'$ has the characteristics such that the image information of the frequency band higher than the middle frequency in the frequency band of the low-resolution approximate image $g_1$ might have been blurred. Therefore, the detail image $b_1$ represents only the image information of the frequency band higher than the middle frequency in the frequency band of the low-resolution approximate image $g_1$. Specifically, as illustrated in FIG. 4, the detail image $b_1$ represents only the image information of the frequency band higher than the middle frequency in the frequency band of the low-resolution approximate image $g_1$, i.e. the image information of the frequency band of N/4 to N/2, where N represents the Nyquist frequency of the original image. In this manner, the detail image is obtained by carrying out the filtering process with the low pass filter having the Gaussian distribution. However, since the image having been obtained from the filtering process is subtracted from the low-resolution approximate image, substantially the same results as those obtained when the filtering process is carried out with a Laplacian filter can be obtained.

The processing described above is carried out successively for low-resolution approximate images $g_k$, where k=1 to N, which have been respectively filtered and sampled with the corresponding filtering means 10. In this manner, as illustrated in FIG. 4, n number of detail images $b_k$, wherein k=0 to L−1 to n, and a residual image $g_L$ of the low-resolution approximate image are obtained. The levels of the resolution of the detail images $b_k$ successively become lower, starting with the resolution of the detail image $b_0$. Specifically, the frequency bands of the detail images $b_k$ successively become lower. The detail images $b_k$ respectively represent the frequency bands of $N/2^{k+1}$ to $N/2^k$ with respect to the Nyquist frequency N of the original image, and the sizes of the detail images $b_k$ become $\frac{1}{2}^{2k}$ times as large as the size of the original image. Specifically, the size of the detail image $b_0$, which has the highest resolution, is equal to the size of the original image, and the size of the detail image $b_1$, which has a high resolution next to the resolution of the detail image $b_0$, is one-fourth of the size of the original image. The sizes of the detail images thus successively become smaller, starting with the size equal to the size of the original image. Also, the detail images are substantially identical with the images obtained from the process using the Laplacian filter. Therefore, the multi-resolution transform in this embodiment is referred to as the Laplacian pyramid. The residual image $g_L$ may be regarded as being an approximate image having a very low resolution with respect to the original image. In extreme cases, the residual image $g_L$ is constituted of only a single piece of image information, which represents the mean value of the signal values of the original image. The information representing the detail images $b_k$ and the residual image $g_L$, which have thus been obtained, is stored in a memory (not shown).

Thereafter, in the emphasis processing means 3, emphasis processing is carried out on the detail images $b_k$, which have been obtained in the manner described above. How the emphasis processing is carried out will be described hereinbelow.

Figure 5:
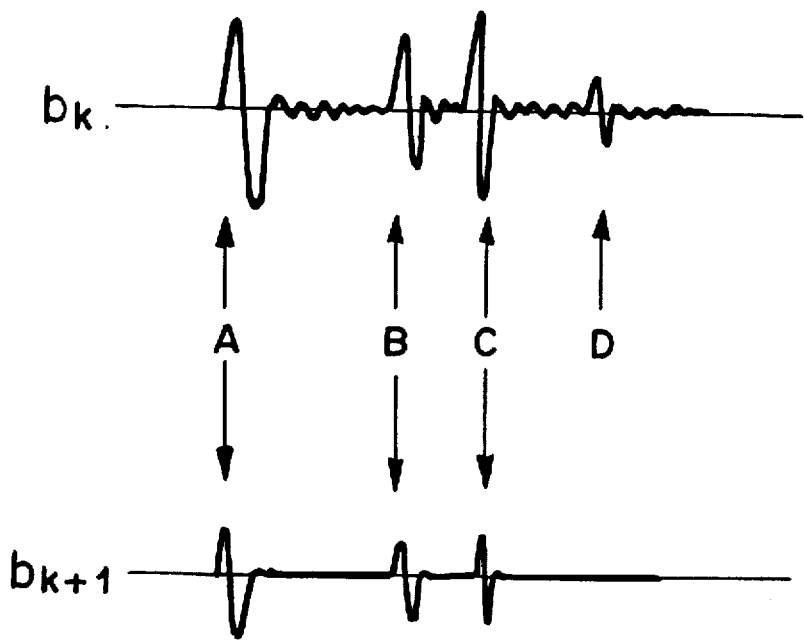
FIG. 5 is an explanatory view showing profiles of image signals representing a detail image $b_k$ and a detail image $b_{k+1}$.

The detail images $b_k$ of the plurality of different frequency bands, which images have been obtained by carrying out the multi-resolution transform in the manner described, have the characteristics described below. Specifically, the components, which represent the contours of the object, or the like, contained in the original image, have certain levels of signal values even in the image of a low frequency band. The components, such as noise components, are contained in the image of a high frequency band, but disappear in the image of a low frequency band. In the image signal representing the image of a low frequency band, the signal values of the components, such as noise components, become close to 0. For example, as illustrated in FIG. 5, when the image signal representing a certain detail image $b_k$ and the image signal representing a detail image $b_{k+1}$, which is of the frequency band lower than the frequency band of the detail image $b_k$, are compared with each other, the two detail images have signal values at points A, B, and C. However, at a point D, the detail image $b_k$ has a signal value, and the signal value of the detail image $b_{k+1}$ is equal to 0. Therefore, it may be regarded that the point D in the image signal representing the detail image $b_k$ represents an unnecessary portion, such as noise, and that the other points A, B, and C correspond to necessary portions, such as contours of the object.

Therefore, in cases where the absolute value of the signal value is comparatively small at a portion in the image of a frequency band lower than a predetermined frequency band subjected to image emphasis, even if the image portion in the image of the predetermined frequency band, which image portion corresponds to such a portion in the image of the lower frequency band, has a certain level of signal value, there will be a strong probability that the image component represented by the signal corresponding to the image portion in the image of the predetermined frequency band will be noise.

Figure 6:
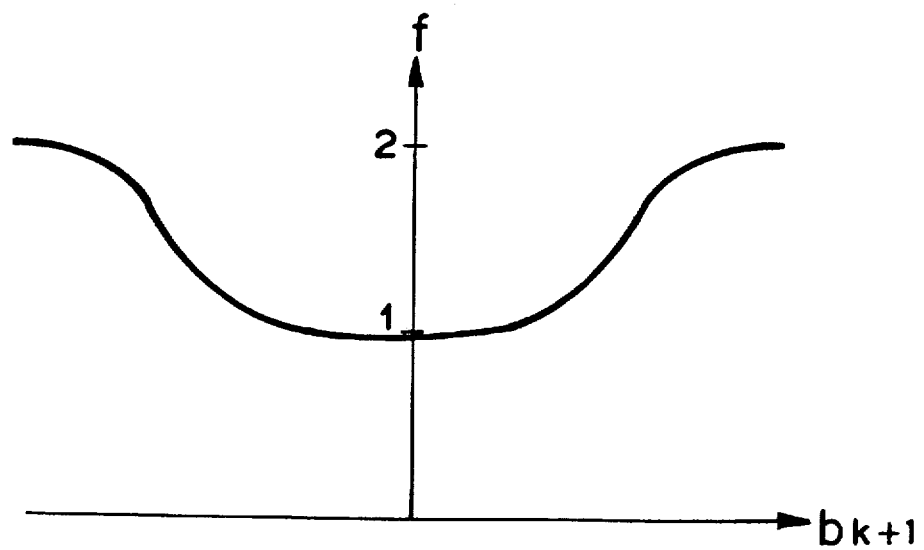
FIG. 6 is a graph showing a degree of emphasis.

Accordingly, in this embodiment, the signal values of a detail image of a frequency band lower than the frequency band of the detail image $b_k$, which is to be subjected to the emphasis processing, are detected. (In this embodiment, the signal values of the detail image $b_{k+1}$ of the frequency band lower by a single level than the frequency band of the detail image $b_k$ are detected.) Also, as for an image portion in the detail image $b_k$, that corresponds to a portion in the detail image $b_{k+1}$, at which portion the absolute value of the signal value of the detail image $b_{k+1}$ is comparatively small, the value of the emphasis coefficient is set to be lower than the values of the emphasis coefficient for the other portions in the detail image $b_k$. Specifically, as illustrated in FIG. 6, as the absolute value of the signal value of the detail image $b_{k+1}$ becomes larger, the degree of emphasis, f, is set to be higher. Thus, e.g., where $b_{k+1}$ is $\pm\alpha$, f is 2; where $b_{k+1}$ is $\pm\beta$, f is 1. The image signal representing the detail image $b_k$ is then multiplied by the degree of emphasis $f(b_{k+1})$, which has thus been set in accordance with the detail image $b_{k+1}$, and an image signal representing an emphasized image $b_{kp}$ is thereby obtained. The calculation is carried out with Formula (1).

$$b_{kp} = b_k \times f(b_{k+1}) \tag{1}$$

The emphasis processing is thus carried out on the detail image $b_k$ of the predetermined frequency band. In this manner, the degree of emphasis for the unnecessary components, such as noise components, in the detail image $b_k$ of the predetermined frequency band becomes lower than the degree of emphasis for the necessary components, such as those representing the object. As a result, the unnecessary components, such as noise components, become imperceptible.

There are four points in the detail image $b_k$, which correspond to a single picture element of the detail image $b_{k+1}$. Therefore, when the values of the coefficient for the emphasis processing are determined, an interpolating operation is carried out on the value of the single picture element of the detail image $b_{k+1}$, which picture element corresponds to four picture elements of the detail image $b_k$, and picture element values of the detail image $b_{k+1}$, which correspond to the four picture elements of the detail image $b_k$, are thereby obtained. The values of the emphasis coefficient for the four picture elements of the detail image $b_k$ are then determined in accordance with the thus obtained picture element values of the detail image $b_{k+1}$. Alternatively, the value of the single picture element of the detail image $b_{k+1}$, which picture element corresponds to four picture elements of the detail image $b_k$, may be taken as a representative value, and the degrees of emphasis for the four picture elements of the detail image $b_k$ may be determined in accordance with the value of the single picture element of the detail image $b_{k+1}$.

Thereafter, an inverse transform is carried out on the detail image $b_k$ of the predetermined frequency band, which image has been obtained from the emphasis processing, and the detail images of the other frequency bands. The restoration processing means 4 carries out the inverse transform processing in the manner described below.

FIG. 7 shows how the inverse transform of the detail images is carried out. Firstly, the image signal representing the residual image $g_L$ is fed into a first interpolating operation means 14. In the first interpolating operation means 14, picture elements are inserted between adjacent picture elements of the residual image $g_L$, and an image signal representing an image $g_L'$, which has a size four times as large as the size of the residual image $g_L$, is thereby obtained. The image signal representing the image $g_L'$ having been obtained from the interpolating operation is then fed into a first adder 15. In the first adder 15, the image signal components of the image signal representing the image $g_L'$ and the image signal representing a lowest resolution detail image $b_{n-1}$, which image signal components represent corresponding picture elements in the two images, are added to each other. An image signal representing an addition image $(g_L' + b_{n-1})$ is thereby obtained. The image signal representing the addition image $(g_L' + b_{n-1})$ is then fed into a second interpolating operation means 14. In the second interpolating operation means 14, picture elements are inserted between adjacent picture elements of the addition image $(g_L' + b_{n-1})$, and an image signal representing an image $b_{n-1}'$, which has a size four times as large as the size of the addition image $(g_L' + b_{n-1})$, is thereby obtained.

Thereafter, the image signal representing the image $b_{n-1}'$ is fed into a second adder 15. In the second adder 15, the image signal components of the image signal representing the image $b_{n-1}'$ and the image signal representing a detail image $b_{n-2}$ of a resolution higher by a single level than the resolution of the detail image $b_{n-1}$, which image signal components represent corresponding picture elements in the two images, are added to each other. An image signal representing an addition image $(b_{n-1}' + b_{n-2})$ is thereby obtained. The image signal representing the addition image $(b_{n-1}' + b_{n-2})$ is then fed into a third interpolating operation means 14. In the third interpolating operation means 14, picture elements are inserted between adjacent picture elements of the addition image $(b_{n-1}' + b_{n-2})$, and an image signal representing an image $b_{n-2}'$, which has a size four times as large as the size of the detail image $b_{n-2}$, is thereby obtained.

The processing described above is iterated, and the same processing is carried out also for the emphasized image $b_{kp}$. Specifically, in an adder 15, the image signal representing the emphasized image $b_{kp}$ and the image signal representing an image $b_{k-1}'$, which is of a resolution lower by a single level than the resolution of the emphasized image $b_{kp}$ and has been obtained from the processing described above, are added to each other. An image signal representing the addition image $(b_{kp} + b_{k-1}')$ is thereby obtained. Thereafter, in an interpolating operation means 14, picture elements are inserted between adjacent picture elements of the addition image ($b_{kp}+b_{k-1}'$), and an image signal representing an interpolation image $b_{kp}'$ is thereby obtained. The processing is successively carried out for the detail images of higher frequency bands. Finally, in an adder 15, an image signal representing an interpolation image $b_1'$ and an image signal representing the detail image $b_0$ having the highest resolution are added to each other, and a processed image signal S' is thereby obtained.

The processed image signal S' having thus been obtained is fed into the image output means 5 and used in the reproduction of a visible image. The image output means 5 may be constituted of a display means, such as a cathode ray tube (CRT) display means, a recording apparatus for recording an image on photographic film by a light beam scanning operation, or a device for storing an image signal in an image file on an optical disk, a magnetic disk, or the like.

In the manner described above, the detail images are obtained from the multi-resolution transform carried out with the Laplacian pyramid technique, and the value of the emphasis coefficient for the detail image of a desired frequency band is set in accordance with the image signal, which represents the detail image of a frequency band lower than the desired frequency band. The emphasis processing can thus be carried out on the detail image of the desired frequency band such that the emphasis of unnecessary components, such as noise components, may be restricted, and such that only the necessary components, such as those representing the contours of the object, may be emphasized. Therefore, in the processed image, which is obtained by carrying out the inverse transform of the detail image of the desired frequency band, which has been emphasized, and the other detail images, only the image information of the desired frequency band has been emphasized, and the unnecessary components, such as noise components, which are contained in the desired frequency band, have not been emphasized. Accordingly, a processed image can be obtained, in which noise is imperceptible and which has good image quality and can serve as an effective tool in, particularly, the efficient and accurate diagnosis of an illness.

In the embodiment described above, the transform of the original image into the multi-resolution images is carried out by utilizing the Laplacian pyramid technique. However, the first image processing method in accordance with the present invention is not limited to the use of the Laplacian pyramid technique. For example, the transform of the original image into the multi-resolution images may be carried out by utilizing one of other techniques, such as a wavelet transform or a sub-band transform.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp 1019–1033, July 1991.

With the wavelet transform, a signal is transformed into frequency signals, each being of one of a plurality of different frequency bands, in accordance with the formula $$W(a, b) = \int_{-\infty}^{\infty} f(t)h(a, b)dt \quad (2)$$

wherein f(t): the signal having an arbitrary wave form, W(a,b): the wavelet transform of f(t), $$h(a, b) = \frac{1}{\sqrt{a}} h(at - b)$$

a: the degree of contraction of the function,
b: the amount of movement in the horizontal axis direction.

Specifically, the filtering process is carried out by changing the period and the degree of contraction of the function h and moving the original signal. In this manner, frequency signals adapted to desired frequencies ranging from a fine frequency to a coarse frequency can be prepared.

The sub-band transform includes the technique for obtaining the images of two frequency bands by utilizing a single kind of filter as in the wavelet transform, and the technique for obtaining the images of a plurality of frequency bands with a single simultaneous operation by utilizing a plurality of kinds of filters.

Also, as in the Laplacian pyramid technique, after the images of plurality of different frequency bands are obtained from the wavelet transform or the sub-band transform, the value of the emphasis coefficient for the image of a desired frequency band may be set in accordance with the value of the image signal, which represents the image of a frequency band lower than the desired frequency band, and the emphasis processing may be carried out by using the thus set value of the emphasis coefficient. The emphasis processing can thus be carried out on the image of the desired frequency band such that only the image information of the desired frequency band may be emphasized, and such that the unnecessary components, such as noise components, contained in the desired frequency band may not be emphasized. Therefore, a processed image can be obtained, in which noise is imperceptible and which has good image quality and can serve as an effective tool in, particularly, the efficient and accurate diagnosis of an illness.

In the embodiment described above, the value of the emphasis coefficient for the image of the desired frequency band, which is subjected to the emphasis processing, is determined in accordance with the signal value of the image of a frequency band lower by a single level than the desired frequency band. Alternatively, the value of the emphasis coefficient for the image of the desired frequency band, which is subjected to the emphasis processing, may be determined in accordance with the signal value of the image of a frequency band lower by two, three, or more levels than the desired frequency band.

An embodiment of the second image processing method in accordance with the present invention will be described hereinbelow.

Figure 8:
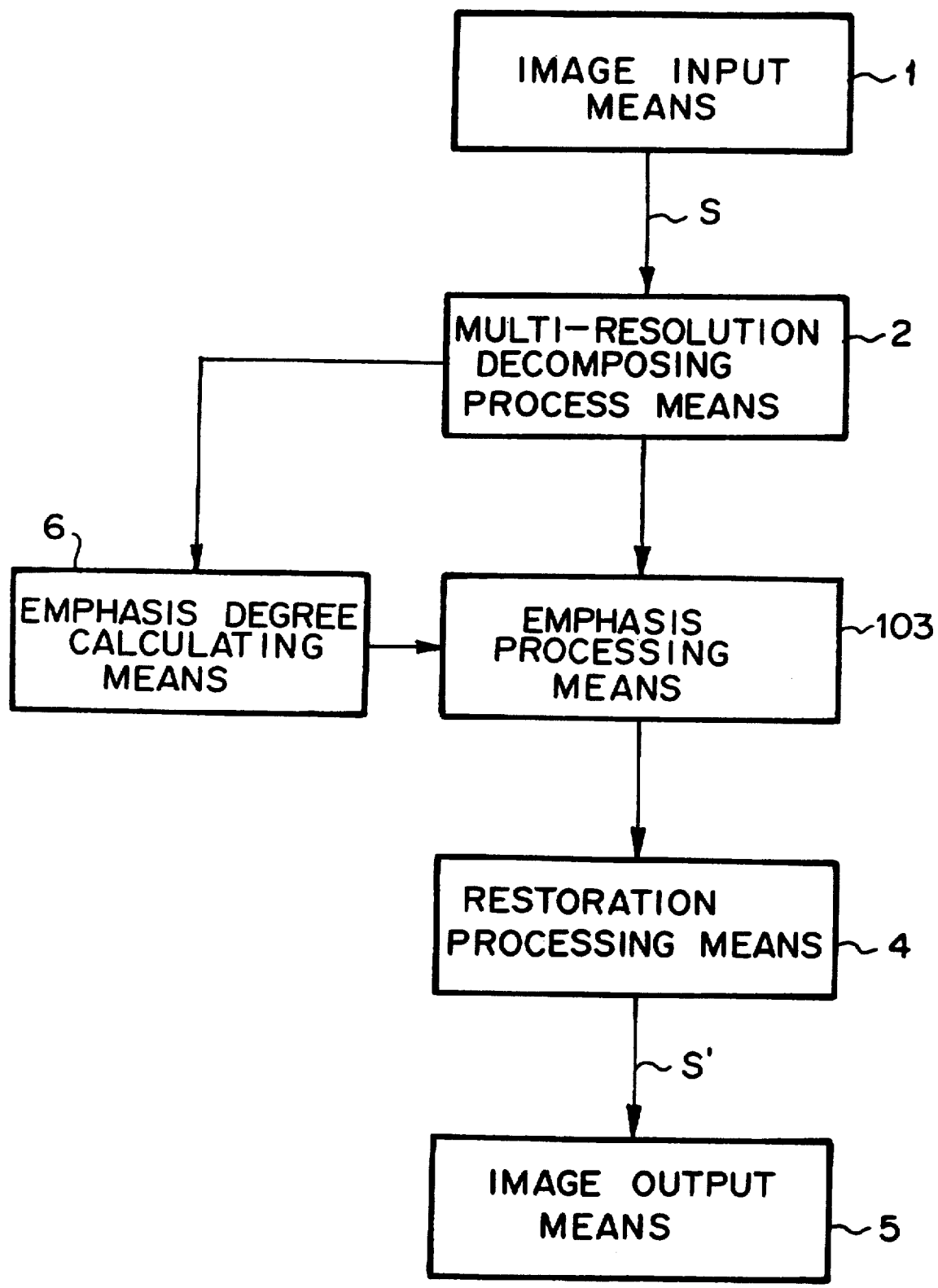
FIG. 8 is a block diagram showing an apparatus for carrying out an embodiment of the second image processing method in accordance with the present invention.

FIG. 8 is a block diagram showing an apparatus for carrying out the embodiment of the second image processing method in accordance with the present invention. As illustrated in FIG. 8, the apparatus for carrying out the embodiment of the second image processing method in accordance with the present invention basically has the same constitution as the apparatus for carrying out the embodiment of the first image processing method in accordance with the present invention, except that the apparatus for carrying out the embodiment of the second image processing method is provided with an emphasis processing means 103 in lieu of the emphasis processing means 3 and is further provided with an emphasis degree calculating means 6. The emphasis processing means 103 carries out emphasis processing, which will be described later, on an image of a predetermined frequency band, which is among the decomposed images of the plurality of the different frequency bands having been obtained from the multi-resolution decomposing process means 2. The emphasis degree calculating means 6 calculates the degree of emphasis in the emphasis processing carried out by the emphasis processing means 103.

How the embodiment of the second image processing method in accordance with the present invention operates will be described hereinbelow. The detail images $b_k$ and the residual image $g_L$ are obtained from the multi-resolution decomposing process means 2 in the same manner as that described above. The information representing the detail images $b_k$ and the residual image $g_L$ is stored in a memory (not shown).

Thereafter, in the emphasis processing means 103, emphasis processing is carried out on the detail images $b_k$, which have been obtained in the manner described above. How the emphasis processing is carried out will be described hereinbelow.

Figure 9:
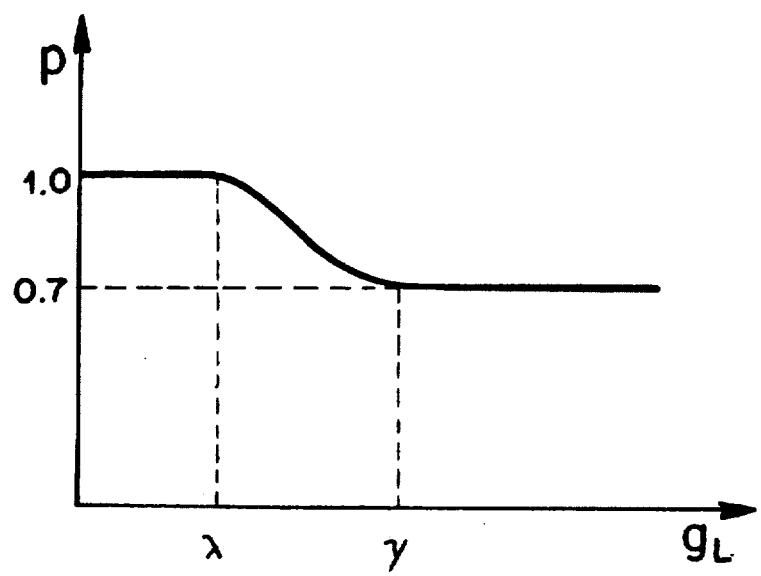
FIG. 9 is a graph showing how the value of p, which determines a degree of emphasis, is set in the embodiment of the second image processing method in accordance with the present invention.

For example, in a radiation image of the chest of a human body, noise is more perceptible in an image region having a comparatively low density, such as the mediastinum region, than in the other image regions. Therefore, if the mediastinum region is emphasized with the same degree of emphasis as that for an image region having a comparatively high density, such as the lung field regions, noise will become perceptible in the emphasized image. The second image processing method and apparatus in accordance with the present invention are based on such findings. In this embodiment, the emphasis degree calculating means 6 calculates the degree of emphasis for the detail image $b_k$, which is to be subjected to the emphasis processing, in accordance with the density of the residual image $g_L$, which has the lowest resolution among the detail images $b_k$ obtained from the multi-resolution transform and the residual image $g_L$. Specifically, the emphasis processing is carried out with Formula (3) shown below.

$$y = -mx(-x/m)^p \ (x<0)$$
$$y = mx(-x/m)^p \ (x \geq 0) \quad (3)$$

wherein x represents the picture element value of each picture element in the detail image $b_k$, y represents the picture element value of each picture element in the detail image $b_k$ obtained from the emphasis processing, and m represents the range of values which the picture elements can take (for example, m=1,023 in cases where the range of values, which the picture elements can take, is 10 bits). As illustrated in FIG. 9, as the density value of the residual image $g_L$ becomes smaller, the value of p in Formula (3) is set to be larger. In FIG. 9, when the density value of $g_L$ is >γ, the value of p is 0.7; for density values of <γ, the value of p is increased above 0.7; for density values <λ, the value of p may reach and remain at 1.0. In this manner, the value of the emphasis coefficient is calculated such that, as the density value of the residual image $g_L$ becomes smaller, the degree of emphasis for the detail image $b_k$ may become lower.

After the degree of emphasis has been calculated by the emphasis degree calculating means 6 in the manner described above, the emphasis processing means 103 carries out the emphasis processing on the detail image $b_k$ in accordance with the calculated degree of emphasis. The emphasis processing is carried out with Formula (3) shown above.

In the emphasis processing carried out with Formula (3), as for the image region in the detail image $b_k$ to be subjected to the emphasis processing, that corresponds to a region in the image of the lowest frequency band, at which region the density of the image of the lowest frequency band is comparatively low, the degree of emphasis for the image region in the detail image $b_k$ is restricted to be lower than the degrees of emphasis for the other regions in the detail image $b_k$. Also, the other regions in the detail image $b_k$ are emphasized with a degree of emphasis higher than the degree of emphasis for the low-density region. In this manner, the degree of emphasis for the low-density image region, in which noise is more perceptible, is restricted to be lower than the degrees of emphasis for the other regions in the detail image $b_k$. As a result, for example, as for a radiation image of the chest of a human body, noise in the mediastinum region having a low density can be restricted, and image information representing the lung field regions having a comparatively high density can be emphasized to a high extent.

There are a plurality of picture elements in the detail image $b_k$ to be subjected to the emphasis processing, which correspond to a single picture element of the residual image $g_L$. Therefore, when the values of the coefficient for the emphasis processing are determined, an interpolating operation is carried out on the value of the single picture element of the residual image $g_L$, which picture element corresponds to the plurality of picture elements of the detail image $b_k$, and picture element values of the residual image $g_L$, which correspond to the plurality of the picture elements of the detail image $b_k$, are thereby obtained. The values of the emphasis coefficient for the plurality of the picture elements of the detail image $b_k$ are then determined in accordance with the thus obtained picture element values of the residual image $g_L$. Alternatively, the value of the single picture element of the residual image $g_L$, which picture element corresponds to the plurality of the picture elements of the detail image $b_k$, may be taken as a representative value, and the degrees of emphasis for the plurality of the picture elements of the detail image $b_k$ may be determined in accordance with the value of the single picture element of the residual image $g_L$.

Thereafter, the inverse transform is carried out on the detail image $b_k$ of the predetermined frequency band, which image has been obtained from the emphasis processing, and the detail images of the other frequency bands. The inverse transform processing is carried out by the restoration processing means 4 in the same manner as that described above.

The processed image signal S' having been obtained from the inverse transform is fed into the image output means 5 and used in the reproduction of a visible image.

In the manner described above, the detail images are obtained from the multi-resolution transform carried out with the Laplacian pyramid technique, and the value of the emphasis coefficient for the detail image of a desired frequency band is set in accordance with the image signal, which represents the image of the lowest frequency band. The emphasis processing can thus be carried out on the detail image of the desired frequency band such that the emphasis of unnecessary components, such as noise components, may be restricted, and such that only the necessary components, such as those representing the contours of the object, may be emphasized. Therefore, in the processed image, which is obtained by carrying out the inverse transform of the detail image of the desired frequency band, which has been emphasized, and the other detail images, only the image information of the desired frequency band has been emphasized, and the unnecessary components, such as noise components, which are contained in the desired frequency band, have not been emphasized. Accordingly, a processed image can be obtained, in which noise is imperceptible and which has good image quality and can serve as an effective tool in, particularly, the efficient and accurate diagnosis of an illness.

Figure 10:
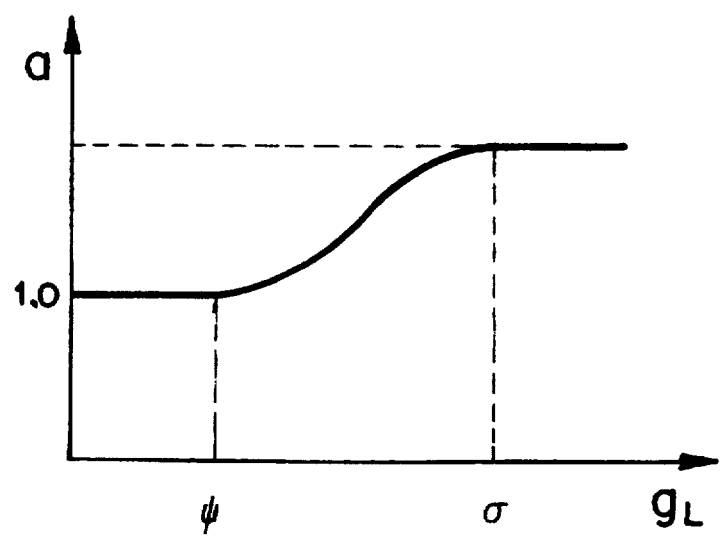
FIG. 10 is a graph showing a degree of emphasis in a different embodiment of the second image processing method in accordance with the present invention.

In the aforesaid embodiment of the second image processing method in accordance with the present invention, the detail image $b_k$ is emphasized with Formula (3). However, the second image processing method in accordance with the present invention is not limited to the use of Formula (3). For example, the detail image $b_k$ may be emphasized with Formula (4) shown below.

$$y = axx \qquad (4)$$

wherein a represents the degree of emphasis. In such cases, as illustrated in FIG. 10, the degree of emphasis, a, is set such that, as the density of the residual image $g_L$ becomes lower, the degree of emphasis, a, may become lower, and such that, as the density of the residual image $g_L$ becomes higher, the degree of emphasis, a, may become higher. In FIG. 10, where $g_L$ is $>\sigma$, a has a value of $\delta$ which is greater than 1.0; where $g_L$ is between $\sigma$ and $\psi$, a has a value less than $\delta$; where $g_L$ has a value less than $\psi$, then a may be kept at 1.0, for example. In cases where the emphasis processing is carried out with Formula (4), as in the emphasis processing carried out with Formula (3), as for the image region in the detail image $b_k$ to be subjected to the emphasis processing, that corresponds to a region in the image of the lowest frequency band, at which region the density of the image of the lowest frequency band is comparatively low, the degree of emphasis for the image region in the detail image $b_k$ is restricted to be lower than the degrees of emphasis for the other regions in the detail image $b_k$. Also, the other regions in the detail image $b_k$ are emphasized with a degree of emphasis higher than the degree of emphasis for the low-density region. In this manner, the degree of emphasis for the low-density image region, in which noise is more perceptible, is restricted to be lower than the degrees of emphasis for the other regions in the detail image $b_k$. As a result, for example, as for a radiation image of the chest of a human body, noise in the mediastinum region having a low density can be restricted, and image information representing the lung field regions having a comparatively high density can be emphasized to a high extent.

In the aforesaid embodiment of the second image processing method in accordance with the present invention, the transform of the original image into the multi-resolution images is carried out by utilizing the Laplacian pyramid technique. However, the second image processing method in accordance with the present invention is not limited to the use of the Laplacian pyramid technique. For example, the transform of the original image into the multi-resolution images may be carried out by utilizing one of other techniques, such as a wavelet transform or a sub-band transform.

Also, as in the embodiment of the second image processing method in accordance with the present invention, wherein the Laplacian pyramid technique is utilized, after the images of plurality of different frequency bands are obtained from the wavelet transform or the sub-band transform, the value of the emphasis coefficient for the image of a desired frequency band may be set in accordance with the value of the image signal, which represents the image of the lowest frequency band, and the emphasis processing may be carried out by using the thus set value of the emphasis coefficient. The emphasis processing can thus be carried out on the image of the desired frequency band such that only the image information of the desired frequency band may be emphasized, and such that the unnecessary components, such as noise components, contained in the desired frequency band may not be emphasized. Therefore, a processed image can be obtained, in which noise is imperceptible and which has good image quality and can serve as an effective tool in, particularly, the efficient and accurate diagnosis of an illness.

What is claimed is:

1. An image processing method, comprising the steps of:
   i) transforming an original image into a multi-resolution space, the original image being thereby decomposed into images, each of which is of one of a plurality of different frequency bands, said images including a residual image $g_L$ at a lowest of said plurality of different frequency bands,
   ii) carrying out an operation for multiplying an image signal of a predetermined frequency band, which is among the plurality of the different frequency bands, by an emphasis coefficient, said emphasis coefficient being set such that a degree of emphasis for an image portion in the image of said predetermined frequency band becomes higher than the degrees of emphasis for the other portions in the image of said predetermined frequency band, said image portion corresponding to a portion, in an image of a frequency band other than said lowest frequency band but lower than said predetermined frequency band, at which portion the absolute value of the signal value of the image of said lower frequency band is comparatively large, and
   iii) carrying out an inverse multi-resolution transform of the image of said predetermined frequency band, which has been obtained from said operation for multiplying by said emphasis coefficient, and the images of the other frequency bands, a processed image being obtained from said inverse multi-resolution transform.

2. A method as defined in claim 1 wherein said transform of the original image into the multi-resolution space is carried out with a technique selected from the group consisting of a Laplacian pyramid technique, a wavelet transform, and a sub-band transform.

3. A method as defined in claim 1 wherein the original image is a radiation image.

4. An image processing apparatus, comprising:
   i) image decomposing means for transforming an original image into a multi-resolution space, and thereby decomposing the original image into images, each of which is of one of a plurality of different frequency bands, said images including a residual image $g_L$ at a lowest of said plurality of different frequency bands,
   ii) emphasis processing means for carrying out an operation for multiplying an image signal of a predetermined frequency band, which is among the plurality of the different frequency bands, by an emphasis coefficient, said emphasis coefficient being set such that a degree of emphasis for an image portion in the image of said predetermined frequency band becomes higher than the degrees of emphasis for the other portions in the image of said predetermined frequency band, said image portion corresponding to a portion, in an image of a frequency band other than said lowest frequency band but lower than said predetermined frequency band, at which portion the absolute value of the signal value of the image of said lower frequency band is comparatively large, and iii) inverse transform means for carrying out an inverse multi-resolution transform of the image of said predetermined frequency band, which has been obtained from said operation for multiplying by said emphasis coefficient, and the images of the other frequency bands, and thereby obtaining a processed image.

5. An apparatus as defined in claim 4 wherein said transform of the original image into the multi-resolution space is carried out with a technique selected from the group consisting of a Laplacian pyramid technique, a wavelet transform, and a sub-band transform.

6. An apparatus as defined in claim 4 wherein the original image is a radiation image.

7. An image processing method, comprising the steps of:

i) transforming an original image into a multi-resolution space, the original image being thereby decomposed into images, each of which is of one of a plurality of different frequency bands, ii) calculating degrees of emphasis for an image of a predetermined frequency band, which is among the plurality of the different frequency bands, in accordance with the density of a residual image, which is lowest among the plurality of the different frequency bands, such that the degree of emphasis for an image region in the image of said predetermined frequency band becomes lower than the degrees of emphasis for the other regions in the image of said predetermined frequency band, said image region corresponding to a region in the residual image, at which region the density of the residual image is comparatively low, iii) emphasizing the image of said predetermined frequency band in accordance with said calculated degrees of emphasis, and iv) carrying out an inverse transform of the image of said predetermined frequency band, which has been emphasized, and the images of the other frequency bands, a processed image signal being obtained from said inverse transform.

8. A method as defined in claim 7 wherein said transform of the original image into the multi-resolution space is carried out with a technique selected from the group consisting of a Laplacian pyramid technique, a wavelet transform, and a sub-band transform.

9. A method as defined in claim 7 wherein the original image is a radiation image.

10. An image processing apparatus, comprising:

i) multi-resolution decomposing means for transforming an original image into a multi-resolution space, and thereby decomposing the original image into images, each of which is of one of a plurality of different frequency bands, ii) emphasis degree calculating means for calculating degrees of emphasis for an image of a predetermined frequency band, which is among the plurality of the different frequency bands, in accordance with the density of a residual image, which is lowest among the plurality of the different frequency bands, such that the degree of emphasis for an image region in the image of said predetermined frequency band becomes lower than the degrees of emphasis for the other regions in the image of said predetermined frequency band, said image region corresponding to a region in the residual image, at which region the density of the residual image is comparatively low, iii) emphasis processing means for emphasizing the image of said predetermined frequency band in accordance with said calculated degrees of emphasis, and iv) inverse transform means for carrying out an inverse transform of the image of said predetermined frequency band, which has been emphasized, and the images of the other frequency bands, and thereby obtaining a processed image signal.

11. An apparatus as defined in claim 10 wherein said transform of the original image into the multi-resolution space is carried out with a technique selected from the group consisting of a Laplacian pyramid technique, a wavelet transform, and a sub-band transform.

12. An apparatus as defined in claim 10 wherein the original image is a radiation image.

* * * * *